United States Patent
Swoboda et al.

(10) Patent No.: US 6,919,856 B2
(45) Date of Patent: Jul. 19, 2005

(54) FERRITE ANTENNA

(75) Inventors: Eugenlusz Swoboda, Iserlohn (DE); Martin Witte, Ahaus (DE)

(73) Assignees: Neosid Pemetzrieder GmbH & Co. KG (DE); Hufhülsbeck & Furst GmbH & Co. KG (DE)

( * ) Notice: Subject to any disclaimer, the term of this patent is extended or adjusted under 35 U.S.C. 154(b) by 0 days.

(21) Appl. No.: 10/475,865

(22) PCT Filed: May 18, 2002

(86) PCT No.: PCT/DE02/01797

§ 371 (c)(1),
(2), (4) Date: Oct. 22, 2003

(87) PCT Pub. No.: WO02/095873

PCT Pub. Date: Nov. 28, 2002

(65) Prior Publication Data

US 2004/0150577 A1 Aug. 5, 2004

(30) Foreign Application Priority Data

May 23, 2001 (DE) .......... 101 25 080

(51) Int. Cl.⁷ .......... H01Q 7/08
(52) U.S. Cl. .......... 343/788; 343/712; 455/291
(58) Field of Search .......... 343/711, 712, 343/713, 787, 788, 867; 340/5.62, 5.72, 825.54; 455/280, 291

(56) References Cited

U.S. PATENT DOCUMENTS

| | | | |
|---|---|---|---|
| 2,727,147 A | 12/1955 | Craumer | 334/53 |
| 2,895,129 A | 7/1959 | Kamen et al. | 343/717 |
| 3,665,476 A * | 5/1972 | Taylor | 343/701 |
| 4,101,899 A * | 7/1978 | Jones et al. | 343/788 |
| 4,148,036 A | 4/1979 | Miller | 343/788 |
| 4,760,394 A * | 7/1988 | Takeuchi et al. | 340/10.42 |
| 4,805,232 A * | 2/1989 | Ma | 455/291 |
| 5,134,392 A | 7/1992 | Takeuchi et al. | 340/5.62 |
| 5,767,816 A * | 6/1998 | Cosman | 343/788 |
| 6,795,032 B2 * | 9/2004 | Ieda et al. | 343/713 |

FOREIGN PATENT DOCUMENTS

| | | |
|---|---|---|
| DE | 701 286 | 12/1940 |
| DE | 948 067 | 8/1956 |
| DE | 1 053 048 | 9/1966 |
| DE | 1 252 318 | 10/1967 |
| DE | 298 04 135 | 6/1998 |
| DE | 298 24 118 | 7/2000 |
| DE | 200 00 874 | 6/2001 |
| EP | 1 37 304 | 9/2000 |
| GB | 707142 | 4/1954 |

* cited by examiner

Primary Examiner—Tho Phan
(74) Attorney, Agent, or Firm—R W Becker & Associates; R W Becker

(57) ABSTRACT

The invention relates to a ferrite antenna, comprising at least one winding (4), which is arranged around a core (2) consisting of ferrite material. A second core (3), consisting of ferrite material and running coaxially to the first core (2), is allocated to the first core (2), which carries the winding (4) and is rigidly fixed in the coil carrier (1). Said second core, which can be displaced in an axial direction in the same coil carrier (1), is positioned in such a way that the opposing front faces of the two cores are placed at a predetermined distance from one another. Said distance can be altered by displacing the second core (3) in an axial direction in order to tune the antenna. After tuning, the second core (3) can be fixed in or on the coil carrier (1).

13 Claims, 1 Drawing Sheet

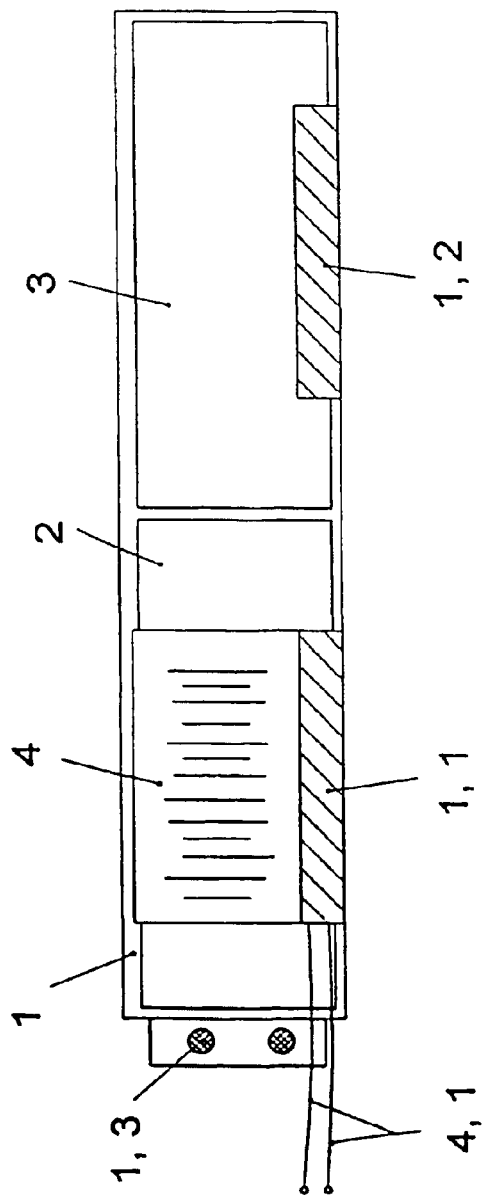
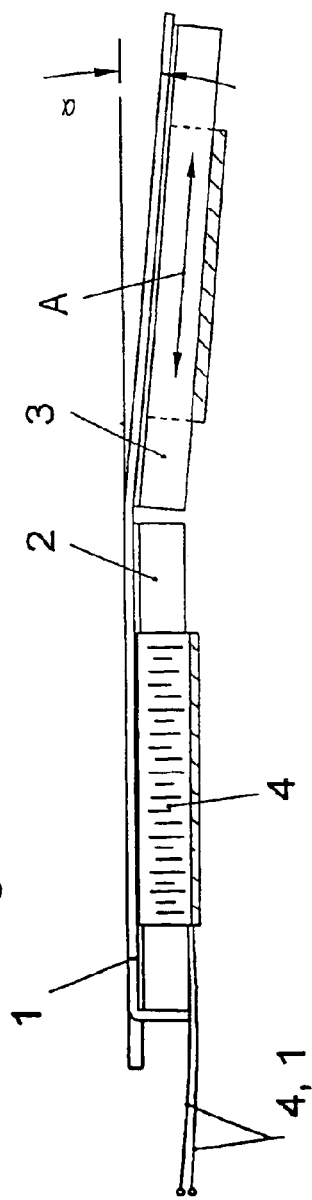

FERRITE ANTENNA

BACKGROUND OF THE INVENTION

The invention relates to a ferrite antenna, with at least one winding which is wound about a core made of ferrite material, as well as a process for producing and tuning such a ferrite antenna.

The invention further relates to a key-less activation and/or closure device for vehicles comprising an antenna which is arranged in the door grip and which includes a core of ferrite material with at least one winding.

It is known, in connection with inductive assembly components and, especially, inductive coils, to wind one or several windings directly onto a core formed of ferrite material. Such inductive assembly components are described, for example, in German Utility Design Patent Nos. 298 04 135.9 and 298 24 118.8. With respect to these thus-configured assembly components, a subsequent tuning to a desired frequency or inductive value is difficult and time-consuming.

For this reason, in connection with ferrite antennas, the winding is generally disposed on a coil carrier comprised of synthetic or plastic material and, for tuning to a desired frequency or inductive value, a ferrite core is inserted or threaded into the coil carrier which is itself, for example, conduit-shaped, the ferrite core being movable in the axial direction and being fixedly securable to the coil carrier after the tuning, via, for example, adhesive securement. A ferrite antenna of this type is described, for example, in German Utility Design Patent No. 200 00 874.9.

With respect to such ferrite antennas, however, it is difficult to configure such antennas with greater than a predetermined length or with less than a predetermined thickness. These limitations arise from the fact that the production of very small ferrite cores of large length is time-consuming and difficult and the fact that the thickness of the coil carrier must be taken into account when considering the total thickness of the building components.

In current day technology, and, especially, in the construction of motor vehicles, there is increasing demand for inductive assembly components and, especially, ferrite antennas, which ferrite antennas, due to installation reasons, should be as long and small as possible, whereby the ferrite antennas should nonetheless be tunable. Such ferrite antennas find use especially in connection with key-less actuation and/or closure devices for vehicles, whereby the ferrite antennas are disposed in door grips, in the interior, or in the bumper.

The invention provides a solution to the challenge of creating a ferrite antenna which is tunable but which can be, however, nonetheless configured as long and small. The production cost should be the lowest possible achievable cost.

SUMMARY OF THE INVENTION

The solution to this challenge results in an apparatus configuration having, in accordance with the present invention, the features set forth in the characterizing clause of the patent claim 1. Advantageous further configurations of the building components are described in the dependent claims.

A key-less actuation and/or closure device for motor vehicles with an antenna, which is disposed in the door grip and comprises a core of ferrite material with at least one winding, is characterized in patent claim 11.

A process for the production and for the tuning of an inductive assembly component of this type is the subject matter of patent claim 12. An advantageous further configuration of the process is described in claim 13.

The core concept of the invention resides in providing the possibility of the tuning of a second rod. Both ferrite cores are disposed coaxial to one another in a coil carrier, whereby the first ferrite core, which supports a winding, is ab initio fixedly secured in the coil carrier and the second ferrite core for tuning of the coil is disposed in an axially displaceable manner in the coil carrier and is first fixedly secured in the coil carrier following the tuning. In this connection, the winding or, respectively, the windings, of the first ferrite core are directly wound about the core and it is also possible that the second core carries at least one winding.

Both ferrite cores can be comprised of the same form and axial length, which leads to a sharp reduction of the overall production costs of the assembly components; they can, however, for special purposes, also be comprised of different forms and lengths. Ferrite cores with right-angled or round cross sections can be deployed and the coil carriers are then configured to correspondingly accommodate the respective core form. The second ferrite core is, in connection with a right-angled cross sectioned configuration thereof, displaceably disposed in the coil carrier while, in connection with a second ferrite core with a round cross section, the ability to displace such a ferrite core as well as the ability to threadably secure such a ferrite core can be provided. For the installation of ferrite antennas in a door grip of a vehicle as part of a key-less actuation and/or closure device, it can be useful if the second ferrite core is pivotable relative to the longitudinal axis of the first ferrite core through an acute angle which is selected with respect to the respective design of the door grip up to a maximum angular value of 30°.

The fixed securement of the ferrite core in the coil carrier can follow in a conventional manner via adhesive securement thereof.

BRIEF DESCRIPTION OF THE DRAWINGS

An embodiment of a ferrite antenna in accordance with the invention is described in closer detail hereinafter with reference to the attached drawings.

The drawings show:

FIG. 1 is a side view of a ferrite antenna;

FIG. 2 is a plan view of the ferrite antenna shown in FIG. 1.

DESCRIPTION OF PREFERRED EMBODIMENTS

The ferrite antenna shown in FIGS. 1 and 2 comprises a coil carrier 1 formed of synthetic or plastic material which is configured as a flat right-angled strip, the strip being provided, on its narrow dimension extent, with a securement tab 1.3 and, on its longitudinal edges, with two securement elements 1.1 and 1.2 each having a hook shaped cross section, the securement elements being spaced from one another in the longitudinal direction and each being specifically configured for receiving a respective one of the two ferrite cores 2 and 3. The ferrite cores 2 and 3 each comprise a right-angled cross section and are disposed with their broad dimension extents on or in the coil carrier 1 such that the securement elements 1.1 and 1.2 extend over the respective narrow dimension extents of the ferrite cores.

A coil winding 4 is fixedly secured on the first ferrite core 2 via direct winding thereonto, whereby the winding ends 4.1 are extended out in the axial direction. The first ferrite core 2 is, directly after its installation in the coil carrier 1, fixedly secured thereto via, for example, adhesive securement.

The second ferrite core 3 is initially disposed on the coil carrier 1 and in the securement element 1.2 in a manner which permits axial displacement of the ferrite core. To effect tuning of the assembly components to a predetermined inductive value or frequency, the second ferrite core 3 is displaced relative to the first ferrite core 2 in the axial direction (arrow A) until the front sides of both ferrite cores 2 and 3, which face one another, are disposed at precisely the desired spacing from one another. Then, the second ferrite core 3 is, as well, fixedly secured to the coil carrier via, for example, adhesive securement.

In order to facilitate the installation of the illustrated ferrite antenna in the door grip of a motor vehicle, as can be deduced by reference to FIG. 2, the second ferrite core 3 is swung relative to the longitudinal axis of the first ferrite core 2 through an acute angle α which, in the illustrated embodiment, amounts to only a few degrees but which can, however, depending upon the respective design of the door grip, amount to a maximum of 30°.

The production and the tuning of the ferrite antennas can be performed, for example, in accordance with the following process steps:

a) positioning the coil carrier 1 in readiness;
b) positioning the two ferrite cores 2 and 3;
c) winding of the first ferrite core 2 with a winding 4;
d) disposing the first ferrite core 2 in the coil carrier 1 and fixedly securing the first ferrite core 2 in the coil carrier 1;
e) disposing the second ferrite core 3 in the coil carrier 1;
f) tuning the assembly components via axial displacement of the second ferrite core 3 in the coil carrier 1;
g) fixedly securing the second ferrite core 3 in the coil carrier 1 via adhesive securement.

The specification incorporates by reference the disclosure of German priority document 101 25 080.0 filed May 23, 2001 and PCT/DE02/01797 filed May 18, 2002.

The present invention is, of course, in no way restricted to the specific disclosure of the specification and drawings, but also encompasses any modifications within the scope of the appended claims.

What is claimed is:

1. A ferrite antenna comprising:
a first ferrite core with at least one winding wound thereabout, the first ferrite core being fixedly disposed in a coil carrier; and
second ferrite core, the second ferrite core being coaxial to the first ferrite core and being moveable in an axial direction within the same coil carrier such that a spacing between facing front surfaces of both ferrite cores, which spacing can be varied by movement of the second ferrite core in an axial direction for tuning purposes, is set at a predetermined spacing, whereby the second ferrite core is, following the tuning process, fixedly securable in or on the coil carrier.

2. A ferrite antenna according to claim 1, wherein the at least one winding is directly wound onto the first ferrite core.

3. A ferrite antenna according to claim 1, wherein the second ferrite core also supports at least one winding.

4. A ferrite antenna according to claim 1, wherein the second ferrite core is comprised of the same form and axial length as the first ferrite core.

5. A ferrite antenna according to claim 1, wherein both ferrite cores, comprise a right-angled cross section.

6. A ferrite antenna according to claim 5, wherein the coil carrier is comprised of synthetic or plastic material and is configured as a flat strip on which the broad dimension extent of each ferrite core is disposed and which comprises, on at least one of its longitudinal edges, at least one securement element having a hook shaped cross section and configured for extending over the narrow dimension extent of a respective one of the two ferrite cores.

7. A ferrite antenna according to claim 1, wherein both ferrite cores comprise a round cross section.

8. A ferrite antenna according to claim 7, wherein the coil carrier is comprised of synthetic or plastic material and is configured as a conduit or a partial conduit which encircles at least a portion of the periphery of the respective core.

9. A ferrite antenna according to claim 1, wherein the ferrite cores are fixedly secured in or on the coil carrier via adhesive securement.

10. A ferrite antenna according to claim 1, wherein the second ferrite core is disposed in a pivotable manner relative to the longitudinal axis of the first ferrite core for pivoting about an acute angle a up to a maximum of 30°.

11. A closure device for motor vehicles with an antenna, which is disposed in the door grip, the closure device comprising:
a first ferrite core with at least one winding wound thereabout, the first ferrite core being fixedly disposed in a coil carrier; and
a second ferrite core, the second ferrite core being coaxial to the first ferrite core and being moveable in an axial direction within the same coil carrier such that a spacing between facing front surfaces of both ferrite cores which spacing can be varied by movement of the second ferrite core in an axial direction for tuning purposes, is set at a predetermined spacing, whereby the second ferrite core is, following the tuning process, fixedly securable in or on the coil carrier.

12. A process for producing and tuning a ferrite antenna having a first ferrite core with at least one winding wound thereabout, the first ferrite core being fixedly disposed in a coil carrier, and a second ferrite core, the second ferrite core being coaxial to the first ferrite core and being moveable in an axial direction within the same coil carrier such that a spacing between facing front surfaces of both ferrite cores can be varied by movement of the second ferrite core in the axial direction for tuning purposes, the process comprising:

a) positioning the coil carrier in readiness;
b) positioning the two ferrite cores;
c) winding of the first ferrite core with a winding;
d) disposing the first ferrite core in the coil carrier and fixedly securing the first ferrite core in the coil carrier;
e) disposing the second ferrite core in the coil carrier;
f) tuning the assembly components via axial displacement of the second ferrite core in the coil carrier; and
g) fixedly securing the second ferrite core in the coil carrier via adhesive securement.

13. A process according to claim 12, wherein the fixed securement of the first ferrite core and the second ferrite core in the coil carrier is effected via adhesive securement.

* * * * *

UNITED STATES PATENT AND TRADEMARK OFFICE
CERTIFICATE OF CORRECTION

PATENT NO. : 6,919,856 B2
DATED : July 19, 2005
INVENTOR(S) : Swoboda et al.

It is certified that error appears in the above-identified patent and that said Letters Patent is hereby corrected as shown below:

<u>Title page,</u>
Item [75], Inventors, should read as follows:
-- Eugeniusz Swoboda, Iserlohn (DE); Martin Witte, Ahaus (DE) --.

Signed and Sealed this

Sixth Day of September, 2005

JON W. DUDAS
*Director of the United States Patent and Trademark Office*